E. A. B. KURRELMEYER.
POULTRY HARNESS.
APPLICATION FILED OCT. 5, 1912.

1,066,821.

Patented July 8, 1913.

UNITED STATES PATENT OFFICE.

EMMA A. B. KURRELMEYER, OF MAPLEWOOD, MISSOURI.

POULTRY-HARNESS.

1,066,821.  Specification of Letters Patent.  Patented July 8, 1913.

Application filed October 5, 1912. Serial No. 724,226.

*To all whom it may concern:*

Be it known that I, EMMA A. B. KURRELMEYER, a citizen of the United States, and a resident of Maplewood, St. Louis county, Missouri, have invented certain new and useful Improvements in Poultry-Harness, of which the following is a specification.

My invention relates to improvements in poultry harness, and has for its object to provide an adjustable harness whereby domestic fowls are prevented from flying.

Figure 1:
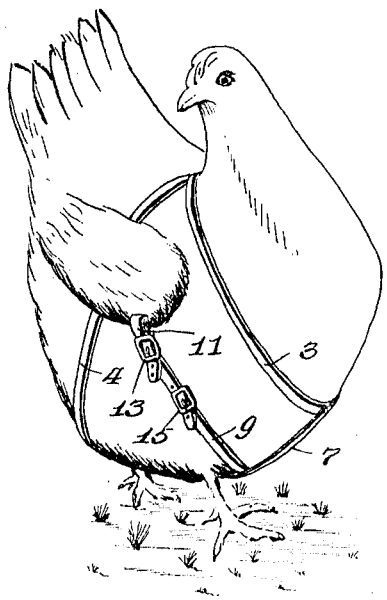
Figure 2:
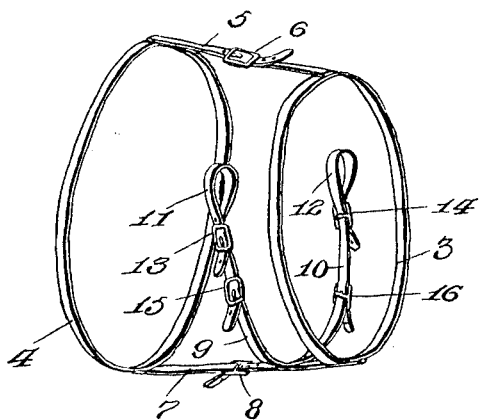

In the drawings—Figure 1 is a perspective view of a fowl, illustrating the application with a harness. Fig. 2 is a similar view of the harness.

As shown in the drawings, I employ a front cincture 3, and a rear cincture 4, which are respectively adapted to encircle the body of the fowl, as illustrated in Fig. 1. These cinctures are connected by a top band 5, which is made separable by means of the buckle 6, and a lower band 7 made separable by the buckle 8. Upon the front portion of the bottom band 7 I provide the wing-straps 9 and 10, whose upper terminals are adapted to be drawn over a joint of each wing of the fowl to form the loops 11 and 12, which are made adjustable by means of buckles 13 and 14. The tension of the wing-straps 9 and 10 is regulated by means of the buckles 15 and 16 respectively, and in practice the tension will be so regulated as to permit a limited movement of the wings of the fowl, not so great as to permit it to fly.

Having thus described my invention, what I claim as new, and desire to have secured to me by the grant of Letters Patent, is—

1. In a poultry harness, the combination of a front cincture; a rear cincture; an adjustable top-band and an adjustable lower-band connecting said cinctures; and wing-straps secured to said lower band.

2. In a poultry harness, the combination of a front cincture; a rear cincture; an adjustable top-band and an adjustable lower-band connecting said cinctures; and adjustable wing-straps secured to said lower band.

In testimony whereof, I have signed my name to this specification, in presence of two subscribing witnesses.

EMMA A. B. KURRELMEYER.

Witnesses:
N. E. BROCKMAN,
JAMES L. HOPKINS.